US012762733B2

(12) United States Patent
Kawamoto et al.

(10) Patent No.: US 12,762,733 B2
(45) Date of Patent: Oct. 13, 2026

(54) METHOD FOR PRODUCING COMPLEMENTARY MODEL

(71) Applicant: KOMATSU LTD., Tokyo (JP)

(72) Inventors: Shun Kawamoto, Tokyo (JP); Shintaro Hamada, Tokyo (JP); Yosuke Kajihara, Tokyo (JP)

(73) Assignee: KOMATSU LTD., Tokyo (JP)

( * ) Notice: Subject to any disclaimer, the term of this patent is extended or adjusted under 35 U.S.C. 154(b) by 187 days.

(21) Appl. No.: 18/912,854

(22) Filed: Oct. 11, 2024

(65) Prior Publication Data

US 2025/0037306 A1 Jan. 30, 2025

Related U.S. Application Data

(62) Division of application No. 17/260,069, filed as application No. PCT/JP2019/028454 on Jul. 19, 2019, now abandoned.

(30) Foreign Application Priority Data

Aug. 31, 2018 (JP) ................................ 2018-163671

(51) Int. Cl.
*G06T 7/73* (2017.01)
*G06T 7/593* (2017.01)

(52) U.S. Cl.
CPC ................ *G06T 7/73* (2017.01); *G06T 7/593* (2017.01); *G06T 2207/10012* (2013.01); *G06T 2207/30252* (2013.01)

(58) Field of Classification Search
None
See application file for complete search history.

(56) References Cited

U.S. PATENT DOCUMENTS

2012/0114181 A1 5/2012 Borthwick et al.
2017/0328032 A1 11/2017 Matsuo et al.
(Continued)

FOREIGN PATENT DOCUMENTS

CN 104200657 A 12/2014
CN 106839977 A 6/2017
CN 106885531 A 6/2017
(Continued)

OTHER PUBLICATIONS

The International Search Report for the corresponding international application No. PCT/JP2019/028454, issued on Sep. 3, 2019.

*Primary Examiner* — Bernard Krasnic
(74) *Attorney, Agent, or Firm* — Spencer Fane LLP

(57) ABSTRACT

A method for producing a complementary model includes acquiring distribution information and incomplete distribution information as a dataset for learning and training the complementary model using the dataset. The distribution information indicates a distribution of an amount of a transport object in a drop target of a work machine, and the incomplete distribution information is information from which some values of the distribution information are missing. The complementary model is trained using the dataset such that when the incomplete distribution information is used as an input value, the complementary model complements the missing values and outputs the distribution information an output value.

8 Claims, 10 Drawing Sheets

(56) References Cited

U.S. PATENT DOCUMENTS

| | | | |
|---|---|---|---|
| 2018/0218304 | A1 | 8/2018 | Shike |
| 2019/0078294 | A1 | 3/2019 | Nagato et al. |

FOREIGN PATENT DOCUMENTS

| | | | | | |
|---|---|---|---|---|---|
| CN | 107168324 | A | | 9/2017 | |
| CN | 107730457 | A | * | 2/2018 | ............... G06T 7/90 |
| CN | 108332682 | A | | 7/2018 | |
| JP | 1-156606 | A | | 6/1989 | |
| JP | 8-95595 | A | | 4/1996 | |
| JP | 11-211438 | A | | 8/1999 | |
| JP | 2000-88541 | A | | 3/2000 | |
| JP | 2001-71809 | A | | 3/2001 | |
| JP | 2004-61300 | A | | 2/2004 | |
| JP | 2005-220633 | A | | 8/2005 | |
| WO | 2016/092684 | A1 | | 6/2016 | |
| WO | 2017061517 | A1 | | 4/2017 | |
| WO | 2017/208997 | A1 | | 12/2017 | |
| WO | 2018/043301 | A1 | | 3/2018 | |

* cited by examiner

METHOD FOR PRODUCING COMPLEMENTARY MODEL

CROSS-REFERENCE TO RELATED APPLICATIONS

This application is a divisional application of U.S. patent application Ser. No. 17/260,694, which is a U.S. National stage application of International Application No. PCT/JP2019/028454, filed on Jul. 19, 2019. Via the U.S. National stage application, this continuation application claims priority to Japanese Patent Application No. 2018-163671, filed in Japan on Aug. 31, 2018, the entire contents of which are hereby incorporated herein by reference.

BACKGROUND

Field of the Invention

The present invention relates to a method for producing a complementary model, and a dataset for learning.

Background Information

Japanese Unexamined Patent Application, First Publication No. 2001-71809 discloses a technique of calculating a position of the center of gravity of a transport object based on the output of a weighting sensor provided on a transport vehicle and displaying a loaded state of the transport object.

SUMMARY

In the method described in Japanese Unexamined Patent Application, First Publication No. 2001-71809, the position of the center of gravity of a drop target such as the transport vehicle can be determined, but a three-dimensional position of the transport object in the drop target cannot be specified.

An object of the present invention is to provide a method for producing a complementary model capable of specifying a three-dimensional position of a transport object in a drop target.

According to one aspect of the present invention, method for producing a complementary model includes acquiring distribution information and incomplete distribution information as a dataset for learning and training the complementary model using the dataset. The distribution information indicates a distribution of an amount of a transport object in a drop target of a work machine. The incomplete distribution information is information in which some values of the distribution information are missing. The complementary model is trained using the dataset for learning such that when the incomplete distribution information is used as an input value, the distribution information becomes an output value.

According to at least one of the above aspects, the transport object specifying device can specify the distribution of the transport object in the drop target.

DETAILED DESCRIPTION OF EMBODIMENT(S)

First Embodiment

Hereinafter, embodiments will be described in detail with reference to drawings.

Figure 1:
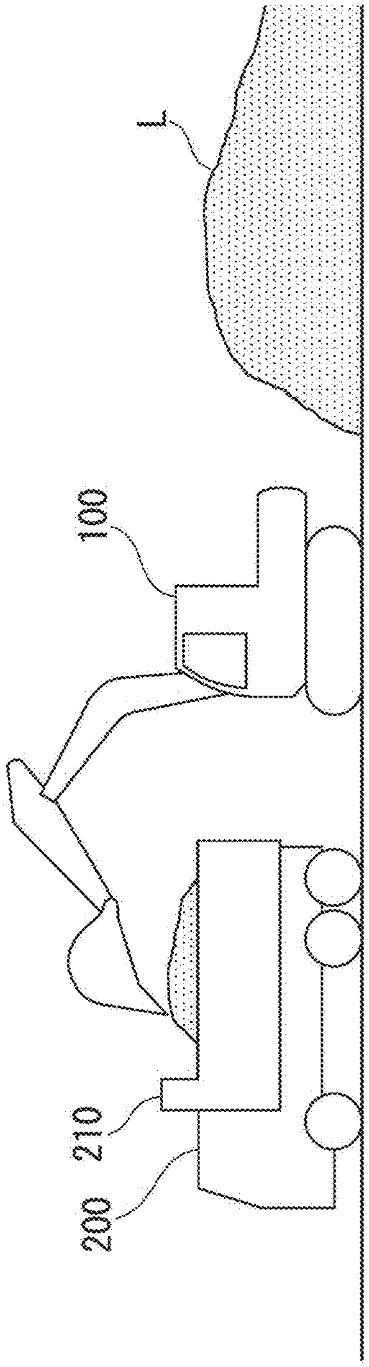
FIG. 1 is a diagram showing a configuration of a loading place according to one embodiment.

FIG. 1 is a diagram showing a configuration of a loading place according to one embodiment.

At a construction site, a hydraulic excavator 100 which is a loading machine and a dump truck 200 which is a transport vehicle are provided. The hydraulic excavator 100 scoops a transport object L such as earth from the construction site and loads the transport object in the dump truck 200. The dump truck 200 transports the transport object L loaded by the hydraulic excavator 100 to a predetermined earth removable place. The dump truck 200 includes a dump body 210 which is a container for accommodating the transport object L. The dump body 210 is an example of a drop target in which the transport object L is dropped.

(Configuration of Hydraulic Excavator)

Figure 2:
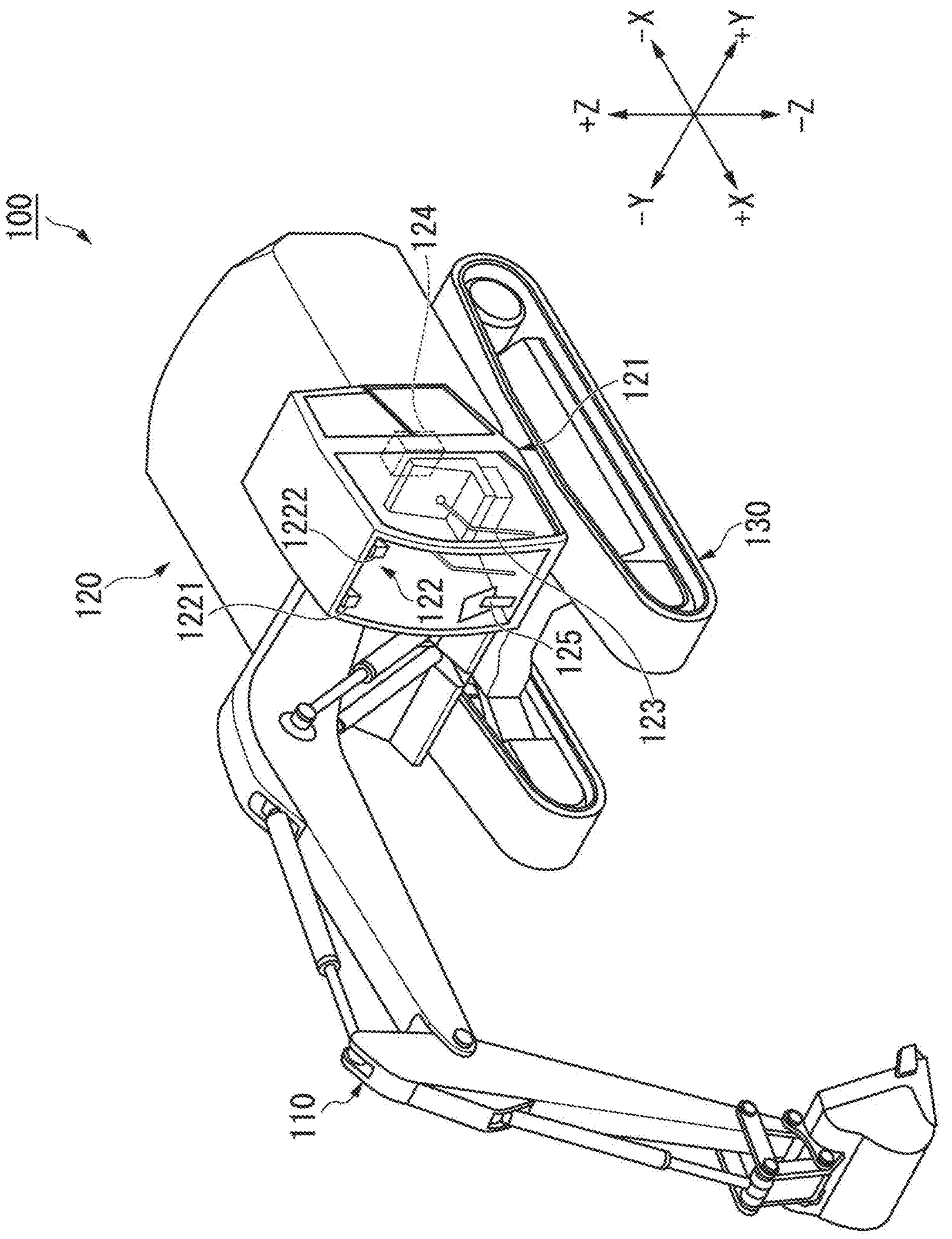
FIG. 2 is an external view of a hydraulic excavator according to one embodiment.

FIG. 2 is an external view of a hydraulic excavator according to one embodiment.

The hydraulic excavator 100 includes work equipment 110 that is hydraulically operated, a swing body 120 that supports the work equipment 110, and a travel body 130 that supports the swing body 120.

The swing body 120 is provided with a cab 121 in which an operator rides. The cab 121 is provided in a front portion of the swing body 120 and is positioned on a left-side (+Y side) of the work equipment 110.

<<Control System of Hydraulic Excavator>>

The hydraulic excavator 100 includes a stereo camera 122, an operation device 123, a control device 124, and a display device 125.

The stereo camera 122 is provided in an upper portion of the cab 121. The stereo camera 122 is installed in an upper (+Z direction) and front (+X direction) portion of the cab 121. The stereo camera 122 captures an image in front (+X direction) of the cab 121 through a windshield on a front surface of the cab 121. The stereo camera 122 includes at least one pair of cameras.

The operation device 123 is provided inside the cab 121. The operation device 123 is operated by the operator to supply hydraulic oil to an actuator of the work equipment 110.

The control device 124 acquires information from the stereo camera 122 to generate guidance information indicating a distribution of the transport object in the dump body 210 of the dump truck 200. The control device 124 is an example of a transport object specifying device.

The display device 125 displays the guidance information generated by the control device 124.

The hydraulic excavator 100 according to another embodiment may not necessarily include the stereo camera 122 and the display device 125.

<<Configuration of Stereo Camera>>

In the first embodiment, the stereo camera 122 includes a right-side camera 1221 and a left-side camera 1222. Examples of each camera include a camera using a charge coupled device (CCD) sensor and a complementary metal oxide semiconductor (CMOS) sensor.

The right-side camera 1221 and the left-side camera 1222 are installed at an interval in a left-right direction (Y-axis direction) such that optical axes of the cameras 1221 and 1222 are substantially parallel to a floor surface of the cab 121. The stereo camera 122 is an example of an imaging device. The control device 124 can calculate a distance between the stereo camera 122 and a captured target by using an image captured by the right-side camera 1221 and an image captured by the left-side camera 1222. Hereinafter, the image captured by the right-side camera 1221 is also referred to as a right-eye image. The image captured by the left-side camera 1222 is also referred to as a left-eye image. A combination of the images captured by respective cameras of the stereo camera 122 is also referred to as a stereo image. In another embodiment, the stereo camera 122 may be configured of three or more cameras.

(Configuration of Control Device)

Figure 3:
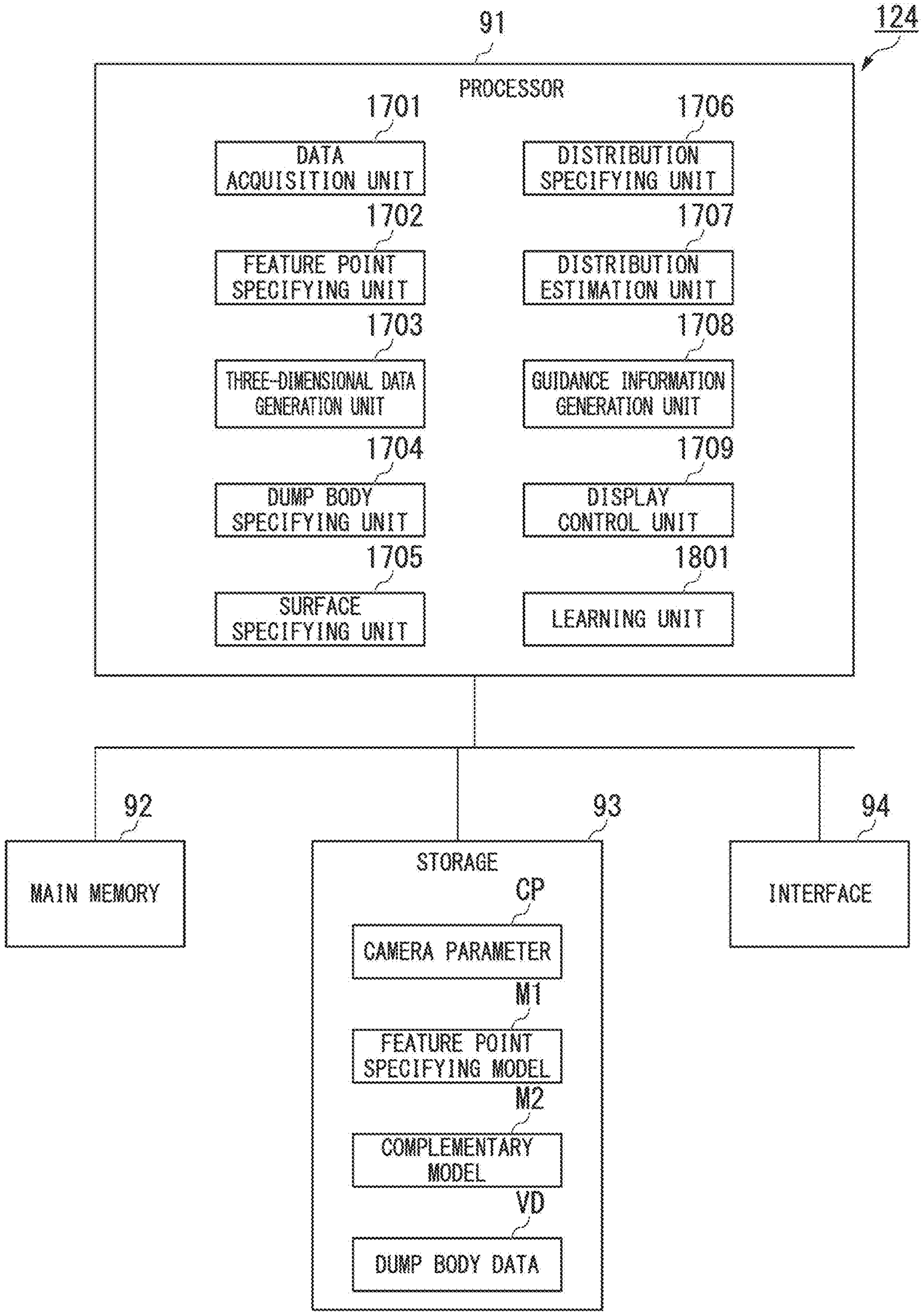
FIG. 3 is a schematic block diagram showing a configuration of a control device according to a first embodiment.

FIG. 3 is a schematic block diagram showing a configuration of the control device according to the first embodiment.

The control device 124 includes a processor 91, a main memory 92, a storage 93, and an interface 94.

The storage 93 stores a program for controlling the work equipment 110. Examples of the storage 93 include a hard disk drive (HDD) and a non-volatile memory. The storage 93 may be an internal medium directly connected to a bus of the control device 124, or may be an external medium connected to the control device 124 through the interface 94 or a communication line. The storage 93 is an example of a storage unit.

The processor 91 reads the program from the storage 93, expands the program in the main memory 92, and executes processing according to the program. The processor 91 secures a storage area in the main memory 92 according to the program. The interface 94 is connected to the stereo camera 122, the display device 125, and other peripheral devices, and transmits and receives signals. The main memory 92 is an example of the storage unit.

With the execution of the program, the processor 91 includes a data acquisition unit 1701, a feature point specifying unit 1702, a three-dimensional data generation unit 1703, a dump body specifying unit 1704, a surface specifying unit 1705, a distribution specifying unit 1706, a distribution estimation unit 1707, a guidance information generation unit 1708, and a display control unit 1709. The storage 93 stores a camera parameter CP, a feature point specifying model M1, a complementary model M2, and a dump body model VD. The camera parameter CP is information indicating a position relationship between the swing body 120 and the right-side camera 1221 and a position relationship between the swing body 120 and the left-side camera 1222. The dump body model VD is a three-dimensional model representing a shape of the dump body 210. In another embodiment, three-dimensional data representing a shape of the dump truck 200 may be used instead of the dump body model VD. The dump body model VD is an example of a target model.

The program may be for realizing part of functions to be exerted by the control device 124. For example, the program may exert a function by a combination with another program already stored in the storage 93 or a combination with another program installed in another device. In another embodiment, the control device 124 may include a custom large scale integrated circuit (LSI) such as a programmable logic device (PLD) in addition to or instead of the above configuration. Examples of the PLD include a programmable array logic (PAL), a generic array logic (GAL), a complex programmable logic device (CPLD), and a field programmable gate array (FPGA). In this case, some or all of the functions realized by the processor may be realized by the integrated circuit.

The data acquisition unit 1701 acquires the stereo image from the stereo camera 122 through the interface 94. The data acquisition unit 1701 is an example of an image acquisition unit. In another embodiment, in a case where the hydraulic excavator 100 does not include the stereo camera 122, the data acquisition unit 1701 may acquire a stereo image from a stereo camera provided in another work machine, a stereo camera installed at the construction site, or the like.

The feature point specifying unit 1702 inputs the right-eye image of the stereo image acquired by the data acquisition unit 1701 to the feature point specifying model M1 stored in the storage 93 to specify positions of a plurality of feature points of the dump body 210 shown in the right-eye image. Examples of the feature point of the dump body 210 include upper and lower ends of a front panel of the dump body 210, an intersection of a guard frame of the front panel and a side gate, and upper and lower ends of a fixed post of a tailgate. That is, the feature point is an example of a predetermined position of the drop target.

Figure 4:
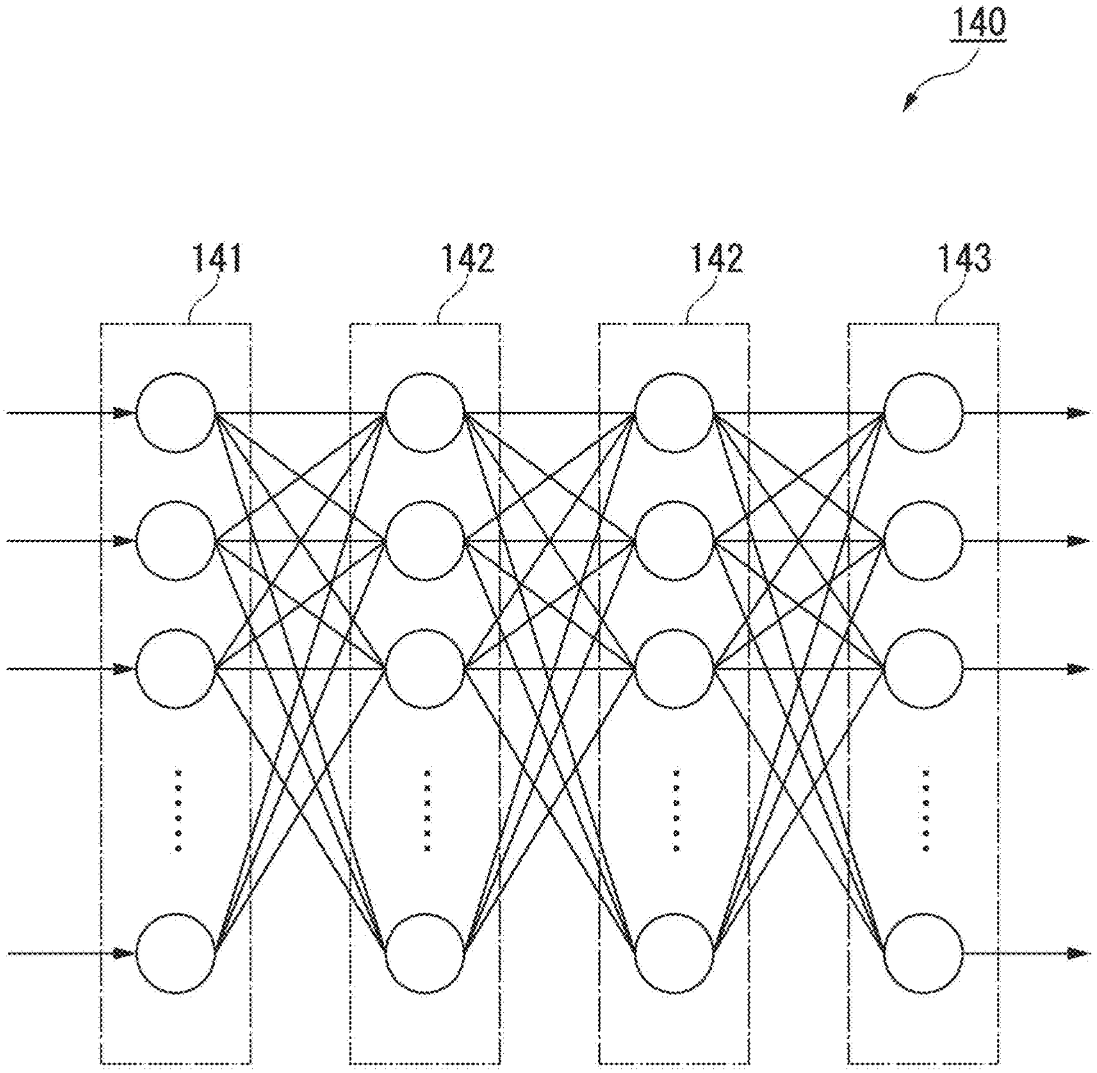
FIG. 4 is a diagram showing an example of a configuration of a neural network.

The feature point specifying model M1 includes a neural network 140 shown in FIG. 4. FIG. 4 is a diagram showing an example of a configuration of the neural network. The feature point specifying model M1 is realized by, for example, a trained model of deep neural network (DNN). The trained model is configured of a combination of a training model and a trained parameter.

As shown in FIG. 4, the neural network 140 includes an input layer 141, one or more intermediate layers 142 (hidden layers), and an output layer 143. Each of the layers 141, 142, and 143 includes one or more neurons. The number of neurons in the intermediate layer 142 can be set as appropriate. The output layer 143 can be set as appropriate according to the number of feature points.

Neurons in the layers adjacent to each other are connected to each other, and a weight (connection load) is set for each connection. The number of connected neurons may be set as appropriate. A threshold value is set for each neuron, and an output value of each neuron is determined by whether or not a sum of products of an input value and the weight for each neuron exceeds the threshold value.

An image showing the dump body 210 of the dump truck 200 is input to the input layer 141. For each pixel of the image, an output value indicating a probability of the pixel being the feature point is output to the output layer 143. That is, the feature point specifying model M1 is a trained model which is trained, when an image showing the dump body 210 is input, to output the positions of the feature points of the dump body 210 in the image. The feature point specifying model M1 is trained by using, for example, a dataset for learning with an image showing the dump body 210 of the dump truck 200 as training data and with an image obtained by plotting the positions of the feature points of the dump body 210 as teaching data. The teaching data is an image in which a pixel related to the plot has a value indicating that the probability of the pixel being the feature point is 1, and other pixel has a value indicating that the probability of the pixel being the feature point is 0. The teaching data may be information of which a pixel related to the plot has a value indicating that the probability of the pixel being the feature point is 1, and other pixel has a value indicating that the probability of the pixel being the feature point is 0, and may not be an image. In the present embodiment, "training data" refers to data input to the input layer during training of the training model. In the present embodiment, "teaching data" is data which is a correct answer for comparison with the value of the output layer of the neural network 140. In the present embodiment, "dataset for learning" refers to a combination of the training data and the teaching data. The trained parameters of the feature point specifying model M1 obtained by training are stored in the storage 93. The trained parameters include, for example, the number of layers of the neural network 140, the number of neurons in each layer, the connection relationship between the neurons, the weight of each connection between the neurons, and the threshold value of each neuron.

For example, the same or similar DNN configuration as a DNN configuration used for detecting a facial organ or a DNN configuration used for estimating a posture of a person can be used as the configuration of the neural network 140 of the feature point specifying model M1. The feature point specifying model M1 is an example of a position specifying model. The feature point specifying model M1 according to another embodiment may be trained by unsupervised learning or reinforcement learning.

The three-dimensional data generation unit 1703 generates a three-dimensional map representing a depth in an imaging range of the stereo camera 122 by stereo measurement using the stereo image and the camera parameters stored in the storage 93. Specifically, the three-dimensional data generation unit 1703 generates point group data indicating a three-dimensional position by the stereo measurement of the stereo image. The point group data is an example of depth data. In another embodiment, the three-dimensional data generation unit 1703 may generate an elevation map generated from the point group data as three-dimensional data instead of the point group data.

The dump body specifying unit 1704 specifies a three-dimensional position of the dump body 210 based on the positions of the feature points specified by the feature point specifying unit 1702, the point group data specified by the three-dimensional data generation unit 1703, and the dump body model VD. Specifically, the dump body specifying unit 1704 specifies three-dimensional positions of the feature points based on the positions of the feature points specified by the feature point specifying unit 1702 and the point group data specified by the three-dimensional data generation unit 1703. Next, the dump body specifying unit 1704 fits the dump body model VD to the three-dimensional positions of the feature points to specify the three-dimensional position of the dump body 210. In another embodiment, the dump body specifying unit 1704 may specify the three-dimensional position of the dump body 210 based on the elevation map.

The surface specifying unit 1705 specifies a three-dimensional position of a surface of the transport object L on the dump body 210 based on the point group data generated by the three-dimensional data generation unit 1703 and the three-dimensional position of the dump body 210 specified by the dump body specifying unit 1704. Specifically, the surface specifying unit 1705 cuts out a part above a bottom surface of the dump body 210 from the point group data generated by the three-dimensional data generation unit 1703 to specify the three-dimensional position of the surface of the transport object L on the dump body 210.

The distribution specifying unit 1706 generates a dump body map indicating a distribution of an amount of the transport object L on the dump body 210 based on the three-dimensional position of the bottom surface of the dump body 210 specified by the dump body specifying unit 1704 and the three-dimensional position of the surface of the transport object L specified by the surface specifying unit 1705. The dump body map is an example of distribution information. The dump body map is, for example, an elevation map of the transport object L with reference to the bottom surface of the dump body 210.

The distribution estimation unit 1707 generates a dump body map in which a value is complemented for a part of the dump body map that does not have a value of height data. That is, the distribution estimation unit 1707 estimates a three-dimensional position of a shielded part of the dump body map that is shielded by an obstacle to update the dump body map. Examples of the obstacle include the work equipment 110, the tailgate of the dump body 210, and the transport object L.

Specifically, the distribution estimation unit 1707 inputs the dump body map into the complementary model M2 stored in the storage 93 to generate a dump body map in which the height data is complemented. The complementary model M2 is realized by, for example, a trained model of DNN including the neural network 140 shown in FIG. 4. The complementary model M2 is a trained model which is trained, when a dump body map including a grid without the height data is input, to output a dump body map in which all grids have the height data. For example, the complementary model M2 is trained with a combination of a complete dump body map in which all grids have the height data, which is generated by simulation or the like, and an incomplete dump body map in which part of the height data is removed from the complete dump body map, as a dataset for learning. The complementary model M2 according to another embodiment may be trained by unsupervised learning or reinforcement learning.

The guidance information generation unit 1708 generates the guidance information from the dump body map generated by the distribution estimation unit 1707.

Figure 5:
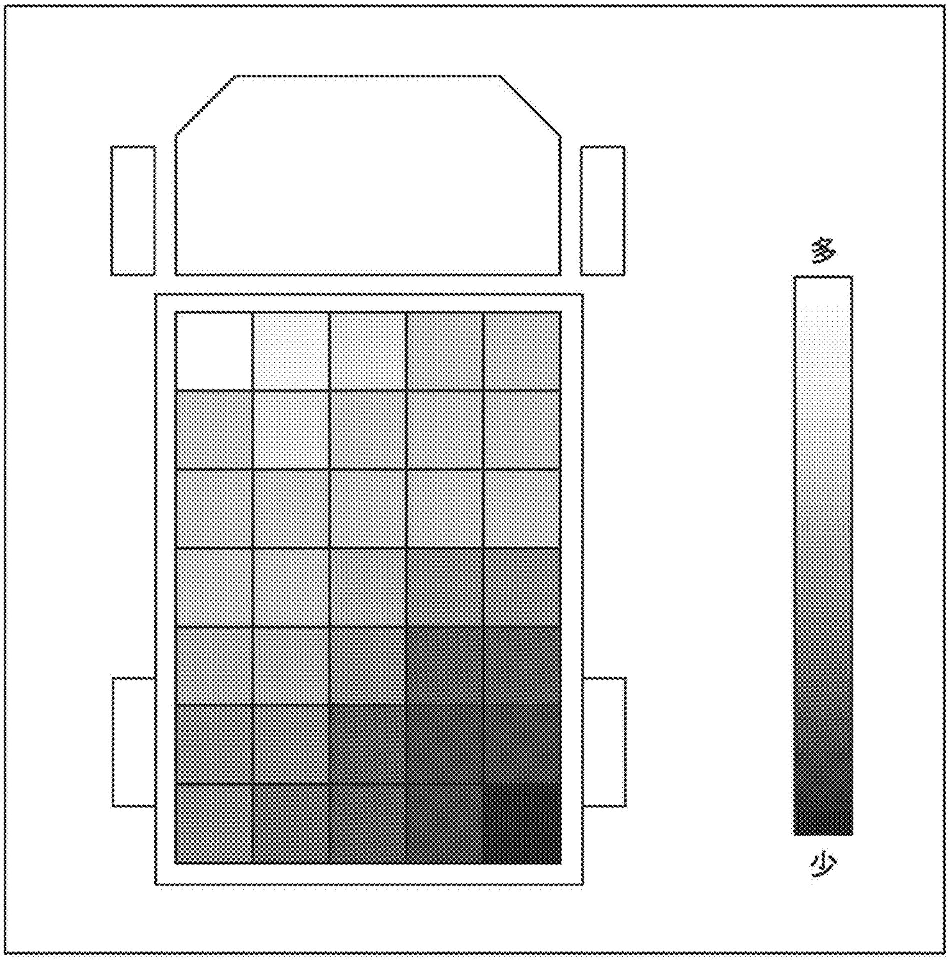
FIG. 5 is an example of guidance information.

FIG. 5 is an example of the guidance information. As shown in FIG. 5, for example, the guidance information generation unit 1708 generates the guidance information for displaying a two-dimensional heat map indicating a distribution of the height from the bottom surface of the dump body 210 to the surface of the transport object L. Granularity of vertical and horizontal divisions in the heat map shown in FIG. 5 is an example and is not limited thereto in another embodiment. The heat map according to another embodiment may represent, for example, a ratio of a height of the transport object L to a height related to an upper limit of the loading of the dump body 210.

The display control unit 1709 outputs a display signal for displaying the guidance information to the display device 125.

The learning unit 1801 performs learning processing of the feature point specifying model M1 and the complementary model M2. The learning unit 1801 may be provided in a device separate from the control device 124. In this case, the trained model which has been trained in the separate device will be recorded in the storage 93.

<<Display Method>>

Figure 6:
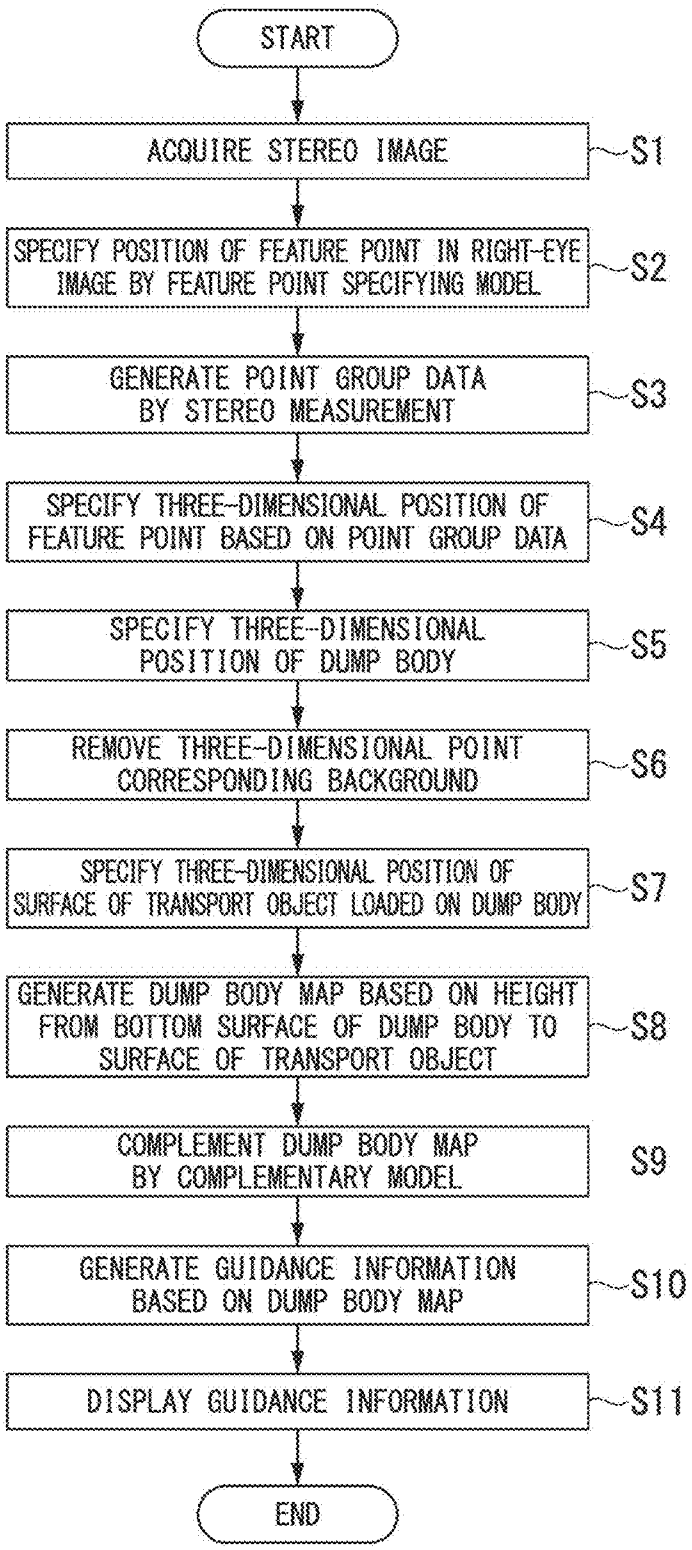
FIG. 6 is a flowchart showing a display method of the guidance information by the control device according to the first embodiment.

FIG. 6 is a flowchart showing a display method of the guidance information by the control device according to the first embodiment.

First, the data acquisition unit 1701 acquires the stereo image from the stereo camera 122 (step S1). Next, the feature point specifying unit 1702 inputs the right-eye image of the stereo image acquired by the data acquisition unit 1701 to the feature point specifying model M1 stored in the storage 93 to specify the positions of the plurality of feature points of the dump body 210 shown in the right-eye image (step S2). Examples of the feature point of the dump body 210 include the upper and lower ends of the front panel of the dump body 210, the intersection of the guard frame of the front panel and the side gate, and the upper and lower ends of the fixed post of the tailgate. In another embodiment, the feature point specifying unit 1702 may input the left-eye image to the feature point specifying model M1 to specify the positions of the plurality of feature points.

The three-dimensional data generation unit 1703 generates the point group data of the entire imaging range of the stereo camera 122 by the stereo measurement using the stereo image acquired in step S1 and the camera parameters stored in the storage 93 (step S3).

The dump body specifying unit 1704 specifies the three-dimensional positions of the feature points based on the positions of the feature points specified in step S2 and the point group data generated in step S3 (step S4). For example, the dump body specifying unit 1704 specifies, using the point group data, a three-dimensional point corresponding to the pixel showing the feature point in the right-eye image to specify the three-dimensional position of the feature point. The dump body specifying unit 1704 fits the dump body model VD stored in the storage 93 to the specified positions of the feature points to specify the three-dimensional position of the dump body 210 (step S5). At this time, the dump body specifying unit 1704 may convert a coordinate system of the point group data into a dump body coordinate system having a corner of the dump body 210 as the origin, based on the three-dimensional position of the dump body 210. The dump body coordinate system can be represented as, for example, a coordinate system composed of an X-axis extending in a width direction of the front panel, a Y-axis extending in a width direction of the side gate, and a Z-axis extending in a height direction of the front panel, with a lower left end of the front panel as the origin. The dump body specifying unit 1704 is an example of a drop target specifying unit.

The surface specifying unit 1705 extracts, from the point group data generated in step S3, a plurality of three-dimensional points in a prismatic area, which is surrounded by the front panel, the side gate, and the tailgate of the dump body 210 specified in step S5 and extends in the height direction of the front panel, to remove three-dimensional points corresponding to the background from the point group data (step S6). The front panel, the side gate, and the tailgate form a wall portion of the dump body 210. In a case where the point group data is converted into the dump body coordinate system in step S5, the surface specifying unit 1705 sets threshold values determined based on a known size of the dump body 210 on the X-axis, the Y-axis, and the Z-axis to extract three-dimensional points in an area defined from the thresholds. The height of the prismatic area may be equal to the height of the front panel or may be higher than the height of the front panel by a predetermined length. The transport object L can be accurately extracted even in a case where the transport object L is loaded higher than the height of the dump body 210 by making a height of the prismatic area higher than that of the front panel. The prismatic area may be an area narrowed inward by a predetermined distance from the area surrounded by the front panel, the side gate, and the tailgate. In this case, even though the dump body model VD is a simple 3D model in which thicknesses of the front panel, the side gate, the tailgate, and the bottom surface are not accurate, an error in the point group data can be reduced.

The surface specifying unit 1705 removes three-dimensional points corresponding to the position of the dump body model VD from the plurality of three-dimensional points extracted in step S6 to specify the three-dimensional position of the surface of the transport object L loaded on the dump body 210 (step S7). The distribution specifying unit 1706 generates the dump body map which is an elevation map representing the height in the height direction of the front panel with the bottom surface of the dump body 210 as a reference height, based on the plurality of three-dimensional points extracted in step S6 and the bottom surface of the dump body 210 (step S8). The dump body map may include a grid without the height data. In a case where the point group data is converted into the dump body coordinate system in step S5, the distribution specifying unit 1706 can generate the dump body map by obtaining an elevation map with an XY plane as the reference height and with the Z-axis direction as the height direction.

The distribution estimation unit 1707 inputs the dump body map generated in step S7 into the complementary model M2 stored in the storage 93 to generate the dump body map in which the height data is complemented (step S8). The guidance information generation unit 1708 generates the guidance information shown in FIG. 5 based on the dump body map (step S9). The display control unit 1709 outputs the display signal for displaying the guidance information to the display device 125 (step S10).

Depending on the embodiment, the processing of steps S2 to S4 and steps S7 to S10 among the processing by the control device 124 shown in FIG. 6 may not be executed.

Instead of the processing of steps S3 and S4 among the processing by the control device 124 shown in FIG. 6, the positions of the feature points in the left-eye image may be specified from the positions of the feature points in the right-eye image by the stereo matching to specify the three-dimensional positions of the feature points using triangulation. Instead of the process of step S6, point group data only in the prismatic area which is surrounded by the front panel, the side gate, and the tailgate of the dump body 210 specified in step S5 and extends in the height direction of the front panel may be generated. In this case, since it is not necessary to generate the point group data of the entire imaging range, the calculation load can be reduced.

(Learning Method)

Figure 7:
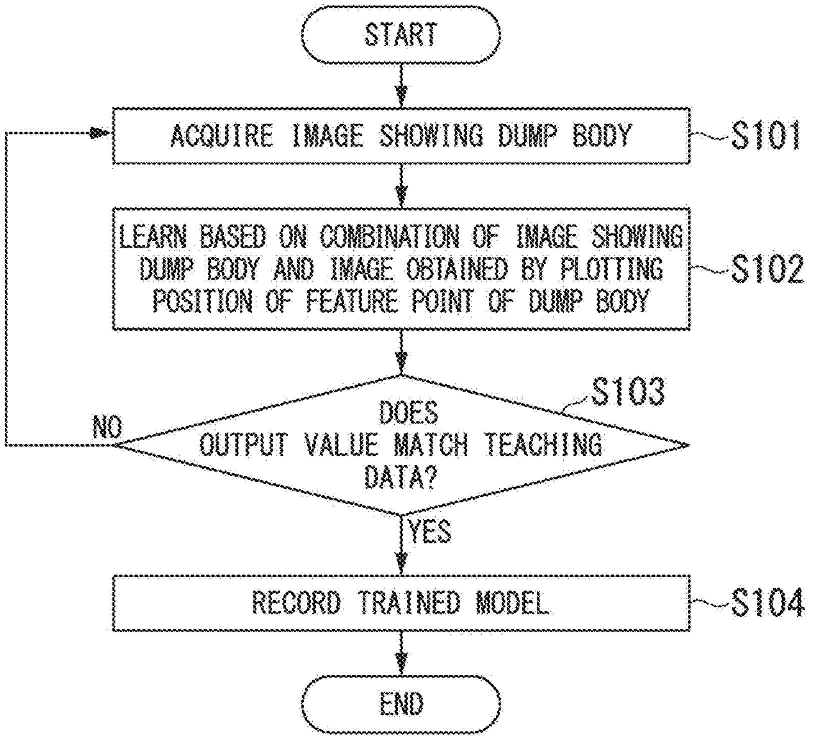
FIG. 7 is a flowchart showing a learning method of a feature point specifying model according to the first embodiment.

FIG. 7 is a flowchart showing a learning method of the feature point specifying model M1 according to the first embodiment. The data acquisition unit 1701 acquires the training data (step S101). For example, the training data in the feature point specifying model M1 is an image showing the dump body 210. The training data may be acquired from an image captured by the stereo camera 122. The training data may be acquired from an image captured by another work machine. An image showing a work machine different from the dump truck, for example, an image showing a dump body of a wheel loader may be used as the training data. It is possible to improve robustness of dump body recognition by using dump bodies of various types of work machines as the training data.

Next, the learning unit 1801 performs training of the feature point specifying model M1. The learning unit 1801 performs training of the feature point specifying model M1 using the combination of the training data acquired in step S101 and the teaching data which is the image obtained by plotting the positions of the feature points of the dump body, as the dataset for learning (step S102). For example, the learning unit 1801 uses the training data as an input to perform calculation processing of the neural network 140 in a forward propagation direction. Accordingly, the learning unit 1801 obtains an output value output from the output layer 143 of the neural network 140. The dataset for learning may be stored in the main memory 92 or the storage 93. Next, the learning unit 1801 calculates an error between the output value from the output layer 143 and the teaching data. The output value from the output layer 143 is a value representing the probability of a pixel being the feature point, and the teaching data is the information obtained by plotting the position of the feature point. The learning unit 1801 calculates an error of the weight of each connection between the neurons and an error of the threshold value of each neuron by backpropagation from the calculated error of the output value. The learning unit 1801 updates the weight of each connection between the neurons and the threshold value of each neuron based on the calculated errors.

The learning unit 1801 determines whether or not the output value from the feature point specifying model M1 matches the teaching data (step S103). It may be determined that the output value matches the teaching data when an error between the output value and the teaching data is within a predetermined value. In a case where the output value from the feature point specifying model M1 does not match the teaching data (step S103: NO), the above processing is repeated until the output value from the feature point specifying model M1 matches the teaching data. As a result, the parameters of the feature point specifying model M1 are optimized, and the feature point specifying model M1 can be trained.

In a case where the output value from the feature point specifying model M1 matches a value corresponding to the feature point (step S103: YES), the learning unit 1801 records the feature point specifying model M1 as a trained model including the parameters optimized by the training in the storage 93 (step S104).

Figure 8:
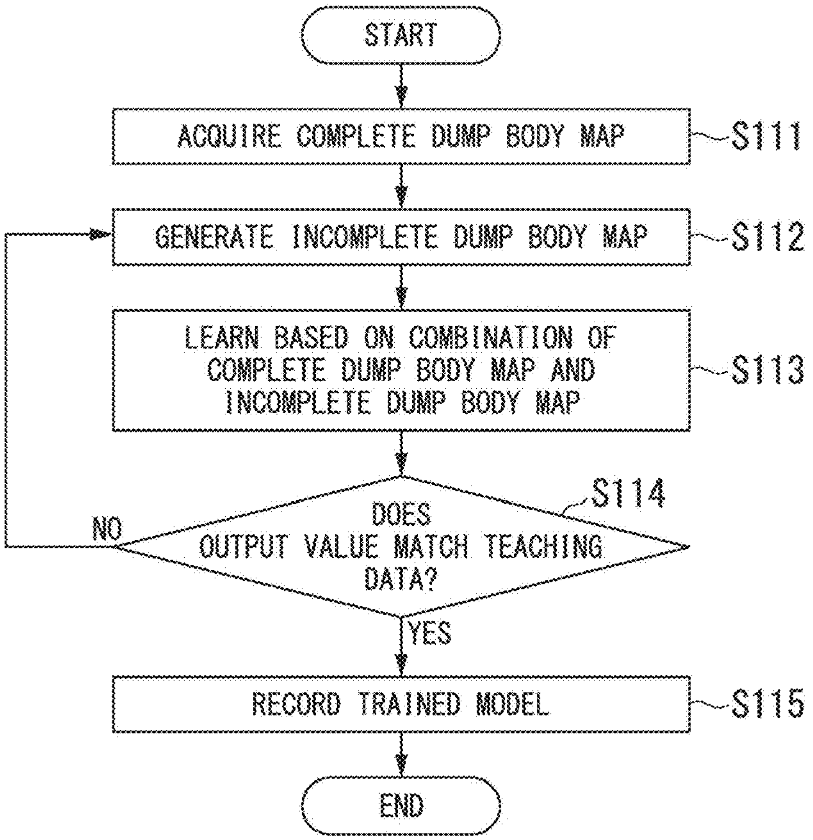
FIG. 8 is a flowchart showing a learning method of a complementary model according to the first embodiment.

FIG. 8 is a flowchart showing a learning method of the complementary model according to the first embodiment. The data acquisition unit 1701 acquires the complete dump body map in which all grids have the height data as teaching data (step S111). The complete dump body map is generated, for example, by simulation or the like. The learning unit 1801 randomly removes a part of the height data of the complete dump body map to generate the incomplete dump body map as training data (step S112).

Next, the learning unit 1801 performs training of the complementary model M2. The learning unit 1801 performs training of the complementary model M2 with the combination of the training data generated in step S112 and the teaching data acquired in step S111 as the dataset for learning (step S113). For example, the learning unit 1801 uses the training data as an input to perform calculation processing of the neural network 140 in a forward propagation direction. Accordingly, the learning unit 1801 obtains an output value output from the output layer 143 of the neural network 140. The dataset for learning may be stored in the main memory 92 or the storage 93. Next, the learning unit 1801 calculates an error between the dump body map output from the output layer 143 and the complete dump body map as the teaching data. The learning unit 1801 calculates an error of the weight of each connection between the neurons and an error of threshold value of each neuron by backpropagation from the calculated error of the output value. The learning unit 1801 updates the weight of each connection between the neurons and the threshold value of each neuron based on the calculated errors.

The learning unit 1801 determines whether or not the output value from the complementary model M2 matches the teaching data (step S114). It may be determined that the output value matches the teaching data when an error between the output value and the teaching data is within a predetermined value. In a case where the output value from the complementary model M2 does not match the teaching data (step S114: NO), the above processing is repeated until the output value from the complementary model M2 matches the complete dump body map. As a result, the parameters of the complementary model M2 are optimized, and the complementary model M2 can be trained.

In a case where the output value from the complementary model M2 matches the teaching data (step S114: YES), the learning unit 1801 records the complementary model M2 as a trained model including the parameters optimized by the training in the storage 93 (step S115).

(Operation and Effects)

As described above, according to the first embodiment, the control device 124 specifies the three-dimensional positions of the surface of the transport object L and the bottom surface of the dump body 210 based on the captured image, and generates the dump body map indicating the distribution of the amount of the transport object L on the dump body 210 based on the three-dimensional positions. Accordingly, the control device 124 can specify the distribution of the transport object L on the dump body 210. The operator can recognize the drop position of the transport object L for loading the transport object L on the dump body 210 in a well-balanced manner by recognizing the distribution of the transport object L on the dump body 210.

The control device 124 according to the first embodiment estimates the distribution of the amount of the transport object L in the shielded part of the dump body map shielded by an obstacle. Accordingly, the operator can recognize the distribution of the amount of the transport object L even for a part of the dump body 210 that is shielded by the obstacle and cannot be captured by the stereo camera 122.

Second Embodiment

The control device 124 according to a second embodiment specifies the distribution of the transport object L on the dump body 210 based on a type of the transport object L.

Figure 9:
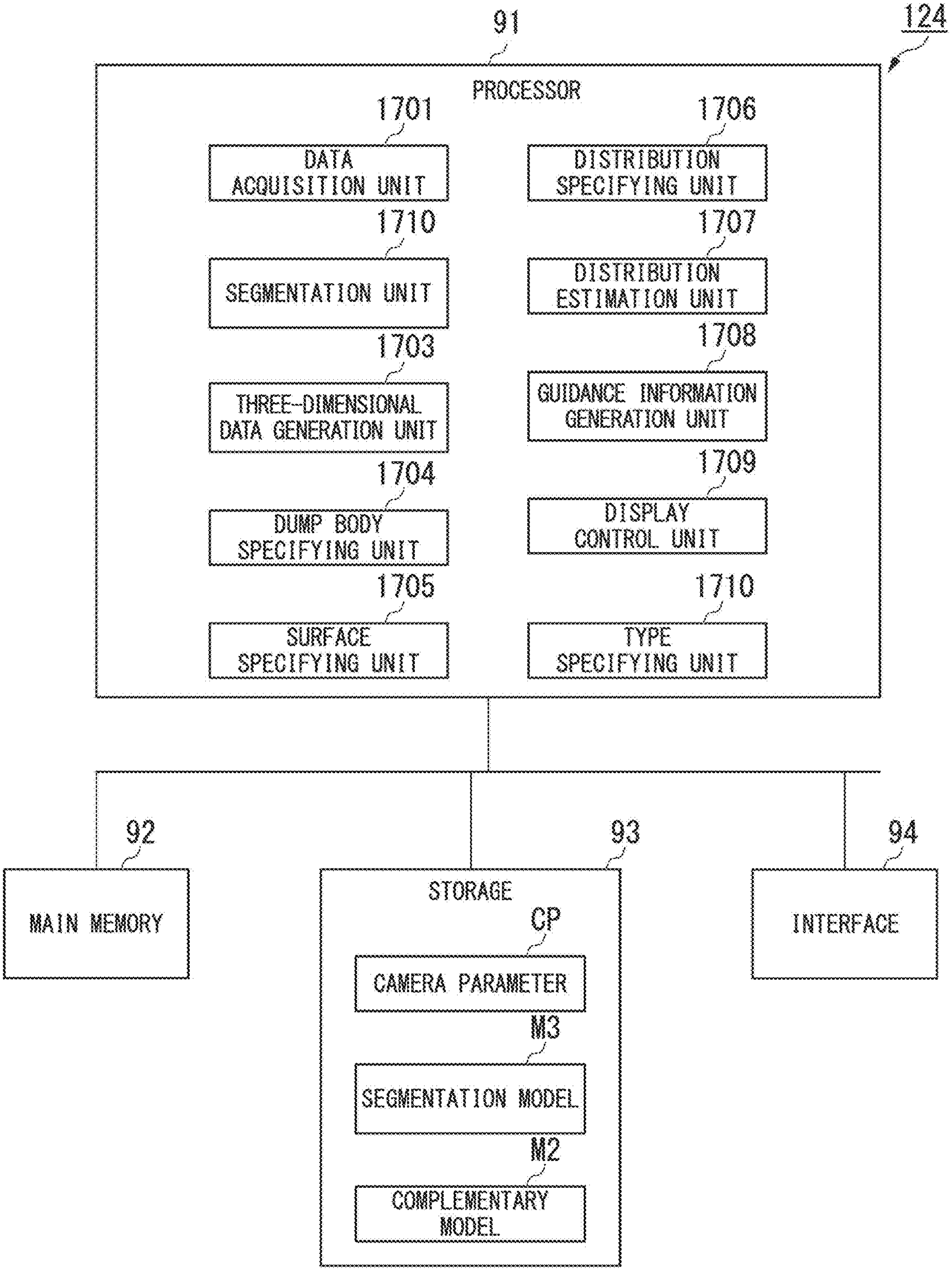
FIG. 9 is a schematic block diagram showing a configuration of a control device according to a second embodiment.

FIG. 9 is a schematic block diagram showing a configuration of a control device according to the second embodiment.

The control device 124 according to the second embodiment further includes a type specifying unit 1710. The storage 93 stores a type specifying model M3 and a plurality of complementary models M2 according to the type of the transport object L.

The type specifying unit 1710 inputs an image of the transport object L to the type specifying model M3 to specify the type of the transport object L shown in the image. Examples of the type of transport object include clay, sand, gravel, rock, and wood.

The type specifying model M3 is realized by, for example, a trained model of deep neural network (DNN). The type specifying model M3 is a trained model which is trained, when an image showing the transport object Lis input, to output the type of the transport object L. As a DNN configuration of the type specifying model M3, for example, the same or similar DNN configuration as a DNN configuration used for image recognition can be used. The type specifying model M3 is trained, for example, using a combination of an image showing the transport object L and a label representing the type of the transport object L as teaching data. The type specifying model M3 is trained using a combination of an image showing the transport object L and label data representing the type of the transport object L as the teaching data. The type specifying model M3 may be trained by transfer learning of a general trained image recognition model. The type specifying model M3 according to another embodiment may be trained by unsupervised learning or reinforcement learning.

The storage 93 stores the complementary model M2 for each type of the transport object L. For example, the storage 93 stores a complementary model M2 for clay, a complementary model M2 for sand, a complementary model M2 for gravel, a complementary model M2 for rock, and a complementary model M2 for wood. Each complementary model M2 is trained, for example, using a combination of a complete dump body map generated by simulation or the like according to the type of the transport object L and an incomplete dump body map obtained by removing part of the height data from the dump body map as teaching data.

(Display Method)

Figure 10:
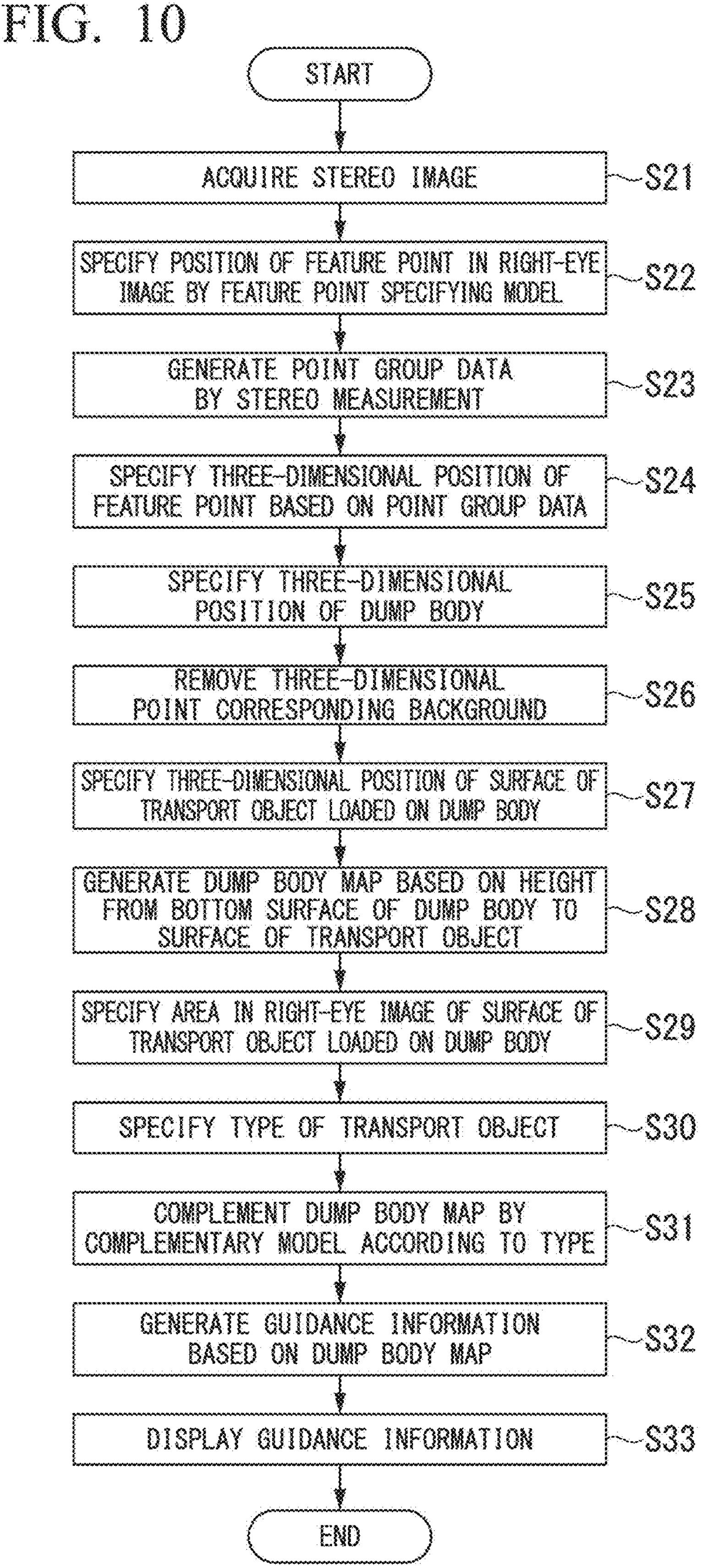
FIG. 10 is a flowchart showing a display method of guidance information by the control device according to the second embodiment.

FIG. 10 is a flowchart showing a display method of the guidance information by the control device according to the second embodiment.

First, the data acquisition unit 1701 acquires the stereo image from the stereo camera 122 (step S21). Next, the feature point specifying unit 1702 inputs the right-eye image of the stereo image acquired by the data acquisition unit 1701 to the feature point specifying model M1 stored in the storage 93 to specify the positions of the plurality of feature points of the dump body 210 shown in the right-eye image (step S22).

The three-dimensional data generation unit 1703 generates the point group data of the entire imaging range of the stereo camera 122 by the stereo measurement using the stereo image acquired in step S21 and the camera parameters stored in the storage 93 (step S23).

The dump body specifying unit 1704 specifies the three-dimensional positions of the feature points based on the positions of the feature points specified in step S22 and the point group data generated in step S23 (step S24). The dump body specifying unit 1704 fits the dump body model VD stored in the storage 93 to the specified positions of the feature points to specify the three-dimensional position of the bottom surface of the dump body 210 (step S25). For example, the dump body specifying unit 1704 disposes, based on at least three specified positions of the feature points, the dump body model VD created based on the dimensions of the dump truck 200 to be detected in a virtual space.

The surface specifying unit 1705 extracts, from the point group data generated in step S23, a plurality of three-dimensional points in a prismatic area, which is surrounded by the front panel, the side gate, and the tailgate of the dump body 210 specified in step S25 and extends in the height direction of the front panel, to remove three-dimensional points corresponding to the background from the point group data (step S26). The surface specifying unit 1705 removes three-dimensional points corresponding to the position of the dump body model VD from the plurality of three-dimensional points extracted in step S6 to specify the three-dimensional position of the surface of the transport object L loaded on the dump body 210 (step S27). The distribution specifying unit 1706 generates the dump body map which is an elevation map with the bottom surface of the dump body 210 as a reference height, based on the plurality of three-dimensional points extracted in step S27 and the bottom surface of the dump body 210 (step S28). The dump body map may include a grid without the height data.

The surface specifying unit 1705 specifies an area where the transport object L appears in the right-eye image based on the three-dimensional position of the surface of the transport object L specified in step S27 (step S29). For example, the surface specifying unit 1705 specifies a plurality of pixels in the right-eye image corresponding to the plurality of three-dimensional points extracted in step S27 and determines an area composed of the plurality of specified pixels as the area where the transport object L appears. The type specifying unit 1710 extracts the area where the transport object L appears from the right-eye image and inputs an image related to the area to the type specifying model M3 to specify the type of the transport object L (step S30).

The distribution estimation unit 1707 inputs the dump body map generated in step S28 to the complementary model M2 associated with the type specified in step S30 to generate the dump body map in which the height data is complemented (step S31). The guidance information generation unit 1708 generates the guidance information based on the dump body map (step S32). The display control unit 1709 outputs the display signal for displaying the guidance information to the display device 125 (step S33).

Operation and Effects

As described above, according to the second embodiment, the control device 124 estimates the distribution of the amount of the transport object L in the shielded part based on the type of the transport object L. That is, characteristics (for example, the angle of repose) of the transport object L loaded on the dump body 210 differ depending on the type of the transport object L. However, according to the third embodiment, it is possible to more accurately estimate the distribution of the transport object L in the shielded part according to the type of the transport object L.

Another Embodiment

Although embodiments have been described in detail with reference to the drawings, a specific configuration is not limited to the above, and various design changes and the like can be made.

For example, although the control device 124 according to the above-described embodiment is mounted on the hydraulic excavator 100, the present invention is not limited thereto. For example, the control device 124 according to another embodiment may be provided in a remote server device. The control device 124 may be realized by a plurality of computers. In this case, part of the configuration of the control device 124 may be provided in the remote server device. That is, the control device 124 may be implemented as a transport object specifying system composed of a plurality of devices.

Although the drop target according to the above-described embodiment is the dump body 210 of the dump truck 200, the present invention is not limited thereto. For example, the drop target according to another embodiment may be another drop target such as a hopper.

Although the captured image according to the above-described embodiment is the stereo image, the present invention is not limited thereto. For example, in another embodiment, the calculation may be performed based on one image instead of the stereo image. In this case, the control device 124 can specify the three-dimensional position of the transport object L by using, for example, a trained model that generates depth information from the one image.

Although the control device 124 according to the above-described embodiment complements the value of the shielded part of the dump body map by using the complementary model M2, the present invention is not limited thereto. For example, the control device 124 according to another embodiment may estimate a height of the shielded part based on a rate of change or a pattern of change in the height of the transport object L near the shielded part. For example, in a case where the height of the transport object L near the shielded part becomes lower as it approaches the shielded part, the control device 124 may estimate the height of the transport object L in the shielded part to a value lower than the height near the shielded part based on the rate of change in the height.

The control device 124 according to another embodiment may estimate the height of the transport object L in the shielded part by simulation in consideration of a physical property such as the angle of repose of the transport object L. The control device 124 according to another embodiment may deterministically estimate the height of the transport object L in the shielded part based on cellular automaton in which each grid of the dump body map is regarded as a cell.

The control device 124 according to another embodiment may not complement the dump body map and may display information related to the dump body map including a part where the height data is missing.

Figure 11A:
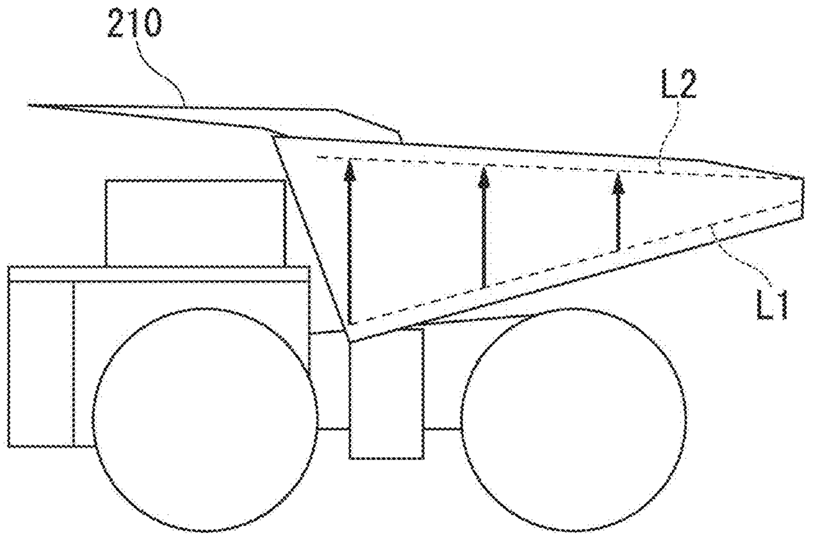
FIG. 11A is a diagram showing a first example of a method for calculating an amount of a transport object in a dump body.
Figure 11B:
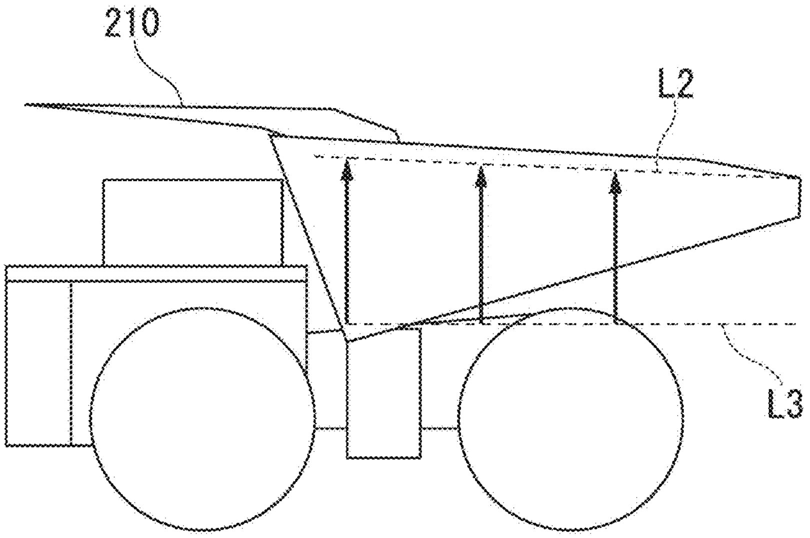
FIG. 11B is a diagram showing a second example of the method for calculating the amount of the transport object in the dump body.

FIG. 11A is a diagram showing a first example of a method for calculating an amount of a transport object in a dump body. FIG. 11B is a diagram showing a second example of the method for calculating the amount of the transport object in the dump body.

As shown in FIG. 11A, the dump body map according to the above-described embodiment is represented by a height from a bottom surface L1 of the dump body 210 to an upper limit of the loading on the dump body 210, but the present invention is not limited thereto.

For example, as shown in FIG. 11B, the dump body map according to another embodiment may represent a height from another reference plane L3 with respect to the bottom surface to a surface L2 of the transport object L. In the example shown in FIG. 11B, the reference plane L3 is a plane parallel to the ground surface and passing through a point of the bottom surface closest to the ground surface. In this case, the operator can easily recognize the amount of the transport object L until the dump body 210 is full, regardless of an inclination of the dump body 210.

Although the control device 124 according to the above-described embodiment generates the dump body map based on the bottom surface of the dump body 210 and the surface of the transport object L, the present invention is not limited thereto. For example, the control device 124 according to another embodiment may calculate the dump body map based on an opening surface of the dump body 210, the surface of the transport object, and a height from the bottom surface to the opening surface of the dump body 210. That is, the control device 124 may calculate the dump body map by subtracting, from the height from the bottom surface to the opening surface of the dump body 210, a distance from an upper end surface of the dump body to the surface of the transport object L. The dump body map according to another embodiment may be based on the opening surface of the dump body 210.

Although the guidance information generation unit 1708 according to the above-described embodiment extracts the feature points from the right-eye image using the feature point specifying model M1, the present invention is not limited thereto. For example, in another embodiment, the guidance information generation unit 1708 may extract the feature points from the left-eye image using the feature point specifying model M1.

The transport object specifying device according to the present invention can specify the distribution of the transport object in the drop target.

What is claimed is:

1. A method for producing a complementary model, the method comprising:

acquiring distribution information indicating a distribution of an amount of a transport object in a drop target of a work machine and incomplete distribution information in which some values of the distribution information are missing, the distribution information and the incomplete distribution information constituting a dataset for learning; and training the complementary model using the dataset for learning such that when the incomplete distribution information is used as an input value to the complementary model, the complementary model outputs the distribution information as an output value, the values of the distribution information that are missing corresponding to a shielded part of the distribution information that is shielded by an obstacle, the distribution information outputted from complementary model complementing a value of the shielded part based on a rate of change or a pattern of change in a three-dimensional position of the transport object near the shielded part, and the complementary model estimating a distribution of an amount of the transport object in the shielded part based on a type of the transport object.

2. The method according to claim 1, wherein the distribution information being generated based on an image of the drop target captured by a camera, and the shielded part includes a portion of the drop target that cannot be captured by the camera due to the obstacle.

3. The method according to claim 1, wherein the drop target is a dump body of a dump truck.

4. The method according to claim 1, wherein the type of the transport object is clay, sand, gravel, rock, or wood.

5. A device for producing a complementary model, the device comprising:

a processor; and a storage, the processor being configured to execute a program stored in the storage to:

acquire distribution information indicating a distribution of an amount of a transport object in a drop target of a work machine and incomplete distribution information in which some values of the distribution information are missing, the distribution information and the incomplete distribution information constituting a dataset for learning; and train the complementary model using the dataset for learning such that when the incomplete distribution information is used as an input value to the complementary model, the complementary model outputs the distribution information as an output value, the values of the distribution information that are missing corresponding to a shielded part of the distribution information that is shielded by an obstacle, the distribution information outputted from complementary model complementing a value of the shielded part based on a rate of change or a pattern of change in a three-dimensional position of the transport object near the shielded part, and the complementary model estimating a distribution of an amount of the transport object in the shielded part based on a type of the transport object.

6. The device according to claim 5, further comprising:

a camera, the distribution information being generated based on an image of the drop target captured by the camera, and the shielded part including a portion of the drop target that cannot be captured by the camera due to the obstacle.

7. The device according to claim 5, wherein the drop target is a dump body of a dump truck.

8. The device according to claim 5, wherein the type of the transport object is clay, sand, gravel, rock, or wood.

* * * * *